United States Patent [19]

Kasai

[11] Patent Number: 4,788,755
[45] Date of Patent: Dec. 6, 1988

[54] CORD TIGHTENING DEVICE

[75] Inventor: Kazumi Kasai, Namerikawa, Japan

[73] Assignee: Yoshida Kogyo K. K., Tokyo, Japan

[21] Appl. No.: 946,714

[22] Filed: Dec. 24, 1986

[30] Foreign Application Priority Data

Dec. 25, 1985 [JP] Japan .................. 60-201839
Dec. 28, 1985 [JP] Japan .................. 60-204493

[51] Int. Cl.$^4$ .................................. F16G 11/00
[52] U.S. Cl. .................... 24/136 R; 24/117; 24/136 A
[58] Field of Search ............... 24/117, 136 R, 136 A, 24/115 M, 30.5 R, 115 H; 403/211

[56] References Cited

U.S. PATENT DOCUMENTS

| 307,806 | 11/1884 | Sailer .................. 24/136 R |
| 1,560,661 | 11/1925 | Carlson ............... 24/136 R |
| 2,199,758 | 5/1940 | Rio ...................... 24/117 R |
| 3,132,390 | 5/1964 | Boden ................ 24/117 R X |
| 3,861,003 | 1/1975 | Boden ................ 24/117 R X |
| 4,059,333 | 11/1977 | Mixon, Jr. ........... 403/211 X |
| 4,102,019 | 7/1978 | Boden .................. 24/117 |

FOREIGN PATENT DOCUMENTS

| 900151 | 11/1984 | Belgium . |
| 384260 | 3/1922 | Fed. Rep. of Germany ... 24/136 A |
| 607508 | 12/1934 | Fed. Rep. of Germany ... 24/136 A |
| 891065 | 8/1953 | Fed. Rep. of Germany ........ 24/117 |
| 1573320 | 7/1969 | France . |
| 252255 | 3/1927 | Italy ..................... 24/117 |
| 52-648 | 1/1977 | Japan . |

Primary Examiner—Kenneth J. Dorner
Assistant Examiner—James R. Brittain
Attorney, Agent, or Firm—Hill, Van Santen, Steadman & Simpson

[57] ABSTRACT

A cord tightening device for tighening cords on anoraks, rucksacks, shopping bags, life jackets, and other bags and pouches includes a body having a pair of spaced face and back plates and a pair of spaced side walls interconnecting the face and back plates. A slider is movably disposed in the body and slidable along a guide groove defined in the face plate. The slider has a retainer for pressing cord portions against the side walls, and has step-like teeth on opposite peripheral surfaces thereof for biting engagement with the cord portions. The face plate may have a pair of cord insertion slots defined therein one on each side of the guide groove and located inwardly of the side walls, respectively, for allowing a cord to be inserted theretrough into the body.

7 Claims, 5 Drawing Sheets

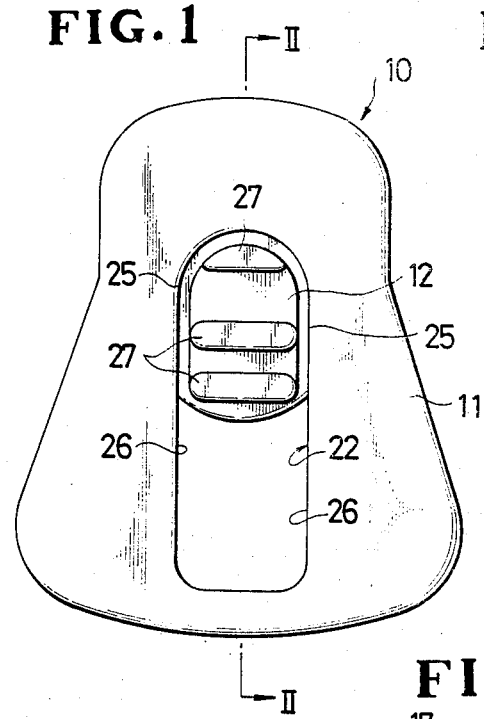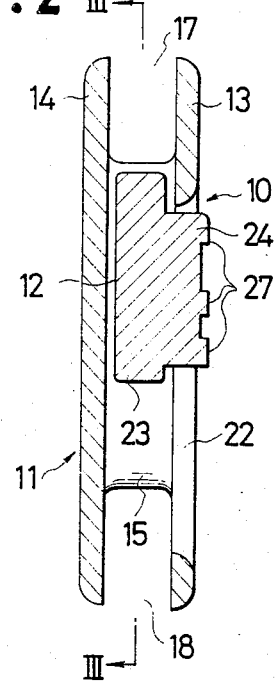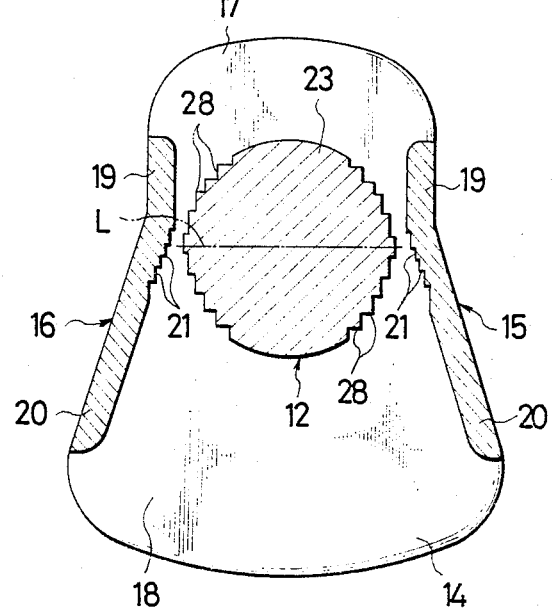

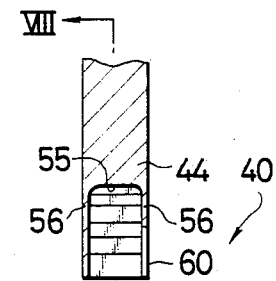
FIG. 7
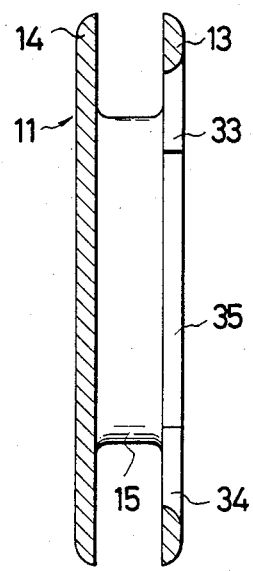
FIG. 6
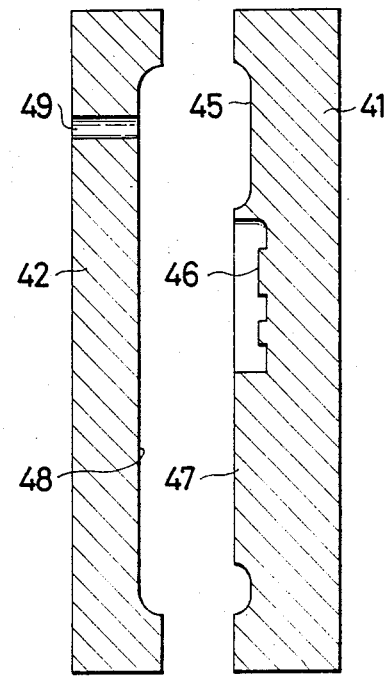
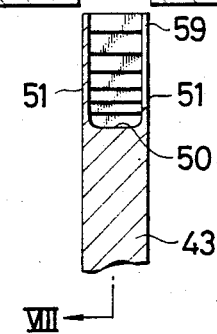

CORD TIGHTENING DEVICE

BACKGROUND OF THE INVENTION

1. Field of the Invention

The present invention relates to a cord tightening device of synthetic resin for tightening cords or strings on various articles such as anoraks, rucksacks, shopping bags, life jackets, and other bags and pouches having openings to be closed with cords or strings.

2. Description of the Prior Art

Known cord tightening devices typically comprise a body composed of face and back plates interconnected by side walls and defining narrower and wider openings therebetween, and a slider disposed in the body for movement between the narrower and wider openings and having radial teeth or serrations on its periphery. A cord to be tightened by such a cord tightening device has its end portions inserted through the body, one between the slider and one of the side walls and the other between the slider and the other side wall. When tightening the cord, the body is pulled so that the slider is moved toward the narrower opening, wedging cord portions against the side walls with the serrations of the slider. Examples of such conventional cord tightening devices are shown in Japanese Patent Publication No. 48-4511 published Feb. 8, 1973 and Japanese Utility Model Publication No. 52-648 published Jan. 10, 1977.

With the prior cord tightening devices, however, the body and the slider with the radial serrations thereon cannot be injection-molded simultaneously by a single mold, but must separately be formed by separate molds. For combining the body and the slider into an assembly, the slider has to be forcibly pushed into the body along a groove defined in the body by elastically deforming the body in order to spread the face and back plates apart to an extent that permits such forced insertion of the slider.

Another common deficiency found in the earlier cord tightening devices described in the aforesaid publications is the difficulty of inserting the cord into one or the other of the narrower and wider openings, especially where the cord is relatively thick.

SUMMARY OF THE INVENTION

In view of the disadvantages of the afore-mentioned cord tightening devices, it is an object of the present invention to provide a cord tightening device which comprises a body and a slider that can be injection-molded simultaneously by a single mold assembly and hence are not required to be assembled together in a subsequent assembling process.

Another object of the present invention is to provide a cord tightening device of a simple and inexpensive construction.

According to the present invention, there is provided a cord tightening device comprising a body having a pair of spaced face and back plates and a pair of spaced side walls interconnecting the face and back plates, the face plate having a guide groove defined therein. The cord tightening device also includes a slider movably disposed in the body and slidable along the guide groove, the slider having a retainer for pressing cord portions against the side walls, the retainer having step-like teeth on opposite peripheral surfaces thereof for biting engagement with the cord portions. The face plate may have a pair of cord insertion slots defined therein one on each side of the guide groove and located inwardly of the side walls, respectively, for allowing a cord to be inserted therethrough into the body.

Many other advantages and features of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 1 is a front elevational view of a cord tightening device according to an embodiment of the present invention;

FIG. 2 is a cross-sectional view taken along line II—II of FIG. 1.

FIG. 3 is a cross-sectional view taken along line III—III of FIG. 2;

FIG. 6 is a cross-sectional view taken along line VI—VI of FIG. 5;

FIG. 7 is a cross-sectional view of a mold assembly for forming a cord tightening device according to the present invention.

DETAILED DESCRIPTION

Figure 4:
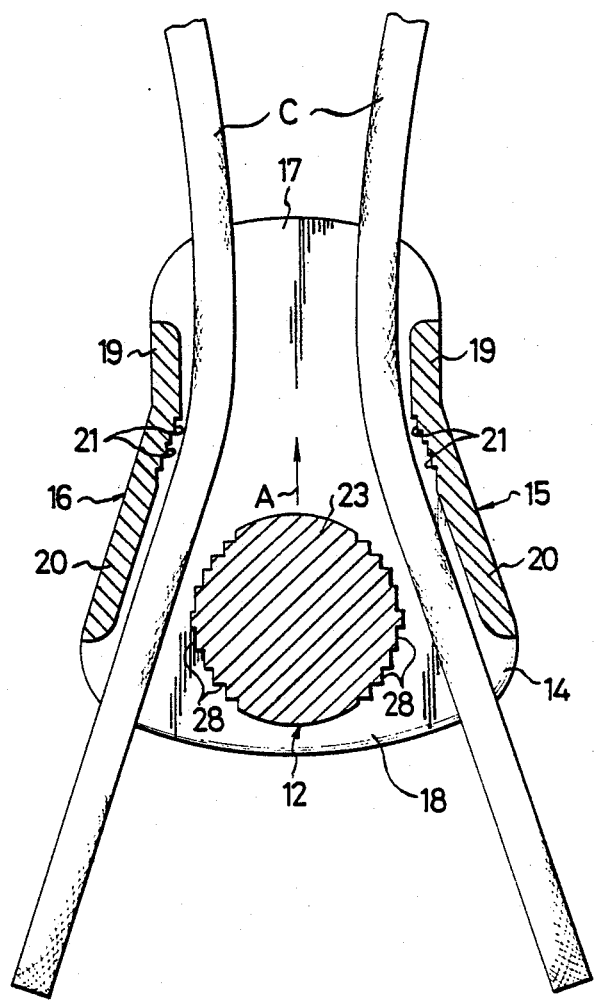
FIG. 4 is a cross-sectional view of the cord tightening device, showing the manner in which it is operated with a cord extending therethrough.

Like or corresponding reference numerals denote like or corresponding parts throughout several views.

The principles of the present invention are particularly useful when embodied in a cord tightening device generally designated by the reference numeral 10 in FIGS. 1 through 4.

The cord tightening device 10 generally comprises a body 11 and a slider 12 slidably disposed in the body 11. The body 11 and the slider 12 are injection-molded of synthetic resin. The body 11 is of a hollow structure composed of a pair of parallel face and back plates 13, 14 spaced from each other and integrally interconnected by a pair of side walls 15, 16 spaced from each other. The side walls 15, 16 converge toward each other upwardly (FIG. 3) and terminate at a narrower opening 17 defined between the upper ends of the face and back plates 13, 14. The side walls 15, 16 diverge away from each to other downwardly (FIG. 3) and terminate at a wider opening 18 defined between the lower ends of the face and back plates 13, 14. More specifically, as shown in FIG. 3, the side walls 15, 16 have shorter upper straight portions 19 extending substantially parallel to each other and longer lower inclined portions 20 extending downwardly from the upper portions 19, respectively, and diverging progressively away from each other in the downward direction. Preferably, but not necessarily, the side walls 15, 16 have a series of teeth or serrations 21 on inner surfaces of the lower portions 20 near the upper portions 19.

As illustrated in FIGS. 1 and 2, the face plate 13 has a vertically elongate guide groove 22 lying at equal distances from the side walls 15, 16 and extending from a position between the upper portions 19 of the side walls 15, 16 downwardly toward a position at the wider opening 18. The slider 12 in the body 11 is slidable along the guide groove 22.

As shown in FIGS. 2 and 3, the slider 12 comprises a substantially circular retainer 23 for securely pressing portions of a cord C (FIG. 4) against the side walls 15, 16 and a knob 24 integral with the retainer 23 and projecting through the guide groove 22 above the outer surface of the face plate 13. The knob 24 is slidably fitted in the guide groove 22 and has a pair of outer parallel edges 25 slidably engaging inner parallel edges 26 of the face plate 13 which define the guide groove 22 therebetween. The knob 24 has on its upper surface a plurality of parallel ridges 27 for providing good frictional contact with the user's finger in moving the slider 12 along the guide groove 22. In FIG. 3, the substantially circular retainer 23 has a series of step-like teeth or serrations 28 on each of diametrically opposite peripheral surfaces thereof which face the side walls 15, 16. The teeth or serrations 28 are located above and below a horizontal central line L of the retainer 23, which extends substantially perpendicularly to the direction in which the slider 12 is slidable along the guide groove 22. The teeth 28 serve to bite into the portions of the cord C to keep the cord C securely in position with respect to the body 11 against undesired slippage. Each of the step-like teeth 23 is defined by a surface extending parallel to the central line L and another surface extending perpendicularly to the central line L. This configuration of the step-like teeth 23 allows the body 11 and the slider 12 to be injection-molded together in one mold assembly, as will be described later on.

As shown in FIG. 4, the end portions of the cord C are inserted through the body 11, one between the side wall 15 and the retainer 23 and the other between the side wall 16 and the retainer 23. When the slider 12 is slidingly displaced in the direction of the arrow A with respect to the body 11, portions of the cord C are gripped between the inner surfaces of the side walls 15, 16 and the teeth 28 which bite into the cord portions. The teeth 21 on the side walls 15, 16 are preferable since they also bite into the cord portions to retain the cord C firmly in position for greater protection against unwanted slippage of the cord C in the body 11.

Figure 5A:
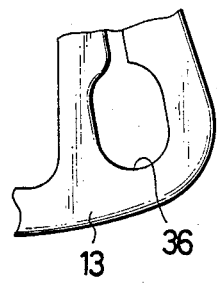
FIG 5A is a fragmentary front elevational view showing a modification of the cord tightening device of FIG. 5.
Figure 5:
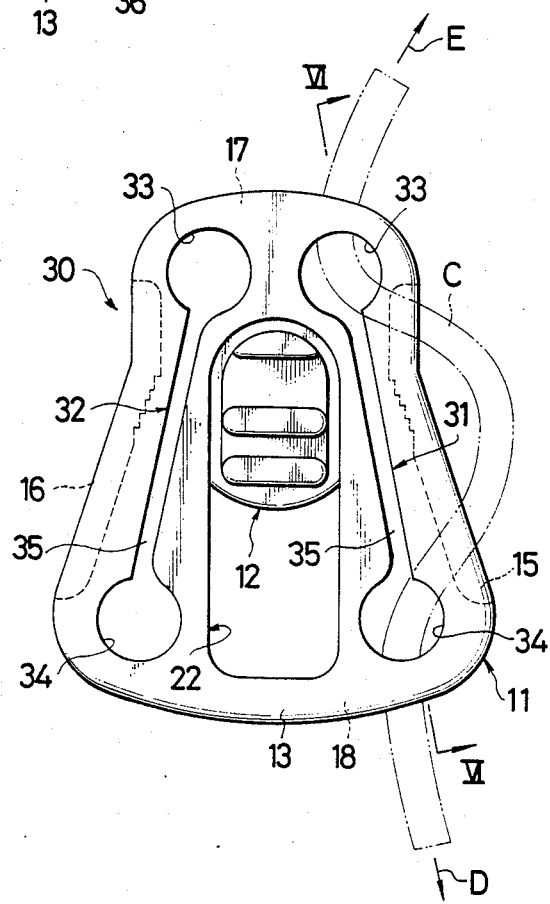
FIG. 5 is a front elevational view of a cord tightening device according to another embodiment of the present invention.

FIGS. 5 and 6 illustrate a cord tightening device 30 according to another embodiment of the present invention. The cord tightening device 30 is different from the cord tightening device 10 shown FIGS. 1 through 4 in that the face plate 13 has a pair of laterally spaced cord insertion slots 31, 32 defined therein one on each side of the guide groove 22 and positioned slightly inwardly of the side walls 15, 16. Each of the cord insertion slots 31, 32 includes a pair of upper and lower holes 33, 34 spaced vertically from each other and located in the narrower and wider openings 17, 18, respectively, and a narrow straight slit 35 communicating bewteen the upper and lower holes 33, 34 and extending substantially along one of the side walls 15, 16. Where a cord C to be inserted in the body 11 is relatively thick, an end of the cord C may first be inserted successively through the holes 33, 34 and the openings 17, 18 with an intermediate cord portion left over the face plate 13, as shown in FIG. 5. Then, the cord C is pulled in the opposite directions indicated by the arrows D, E to force the intermediate cord portion through the slit 35 into the body 11. The relatively thick cord C can therefore be inserted in the body 11 quite easily. The cord C, once inserted in the body 11, is securely retained therein against dislodgement through the slit 35 because the slit 35 is narrow.

Each of the holes 33, 34 is substantially circular in shape. However, as shown in FIG. 5A, they may be of an elongate shape 36 which is elongated in the direction along the slit 35.

Figure 8:
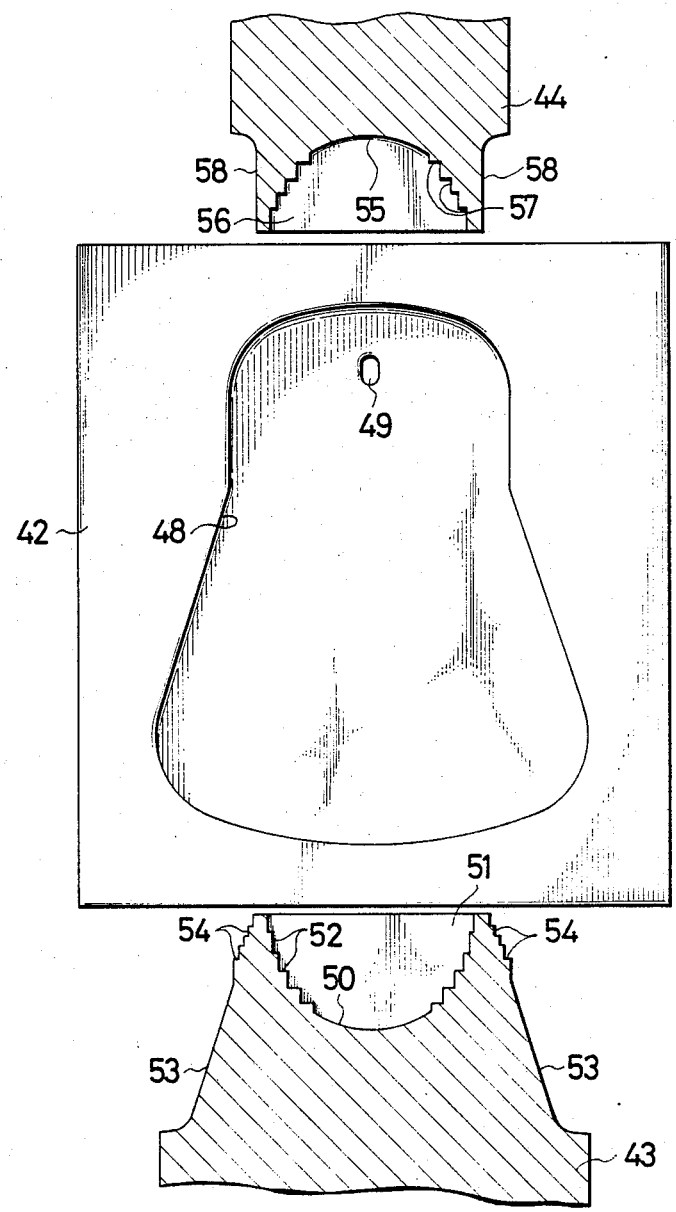
FIG. 8 is a cross-sectional view taken along line VIII—VIII of FIG. 7.

FIGS. 7 and 8 show a mold assembly for injection-molding a cord tightening device in accordance with the present invention. The mold assembly, generally designated by the reference numeral 40, comprises a first mold member 41, a second mold member 42, a first core 43, and a second core 44.

The first mold member 41 has a cavity 45 for forming the face plate 13 of the body 11, another cavity 46 for forming the knob 24, and a projection 47 for forming the guide groove 22 in the face plate 13. The second mold member 42 has a cavity 48 for forming the back plate 14 of the body 11 and a gate 49 communicating with the cavity 48 for pouring molten synthetic resin into the cavity 48.

The first core member 43 is movable into a position between the first and second mold members 41, 42 and has a substantially semicircular cavity 50 for forming one half of the retainer 23 of the slider 12. The cavity 50 is defined centrally in an end of the first core member 43 which is insertable between the first and second mold members 41, 42. The end of the first core member 43 is of a bifurcated shape composed of a pair of parallel, spaced webs 51 defining the cavity 50 therebetween. The semicircular edge which defines the cavity 50 has a series of step-like teeth or serrations 52 on each of its opposite surfaces for forming the teeth or serrations 28 on the half of the retainer 23 which is positioned below the central line L (FIG. 3). The first core member 43 also has a pair of inclined recessed side surfaces 53 for shaping the lower diverging portions 20 of the side walls 15, 16 of the body 11. The inclined side surfaces 53 have respective series of teeth or serrations 54 at their ends near the cavity 50.

Likewise, the second core member 44 is movable into a position between the first and second mold members 41, 42 and has a substantially semicircular cavity 55 for forming the other half of the retainer 23 of the slider 12. The cavity 55 is defined centrally in an end of the second core member 44 which is insertable between the first and second mold members 41, 42. The end of the second core member 44 is of a bifurcated shape composed of a pair of parallel, spaced webs 56 defining the cavity 55 therebetween. The semicircular edge which defines the cavity 55 has a series of step-like teeth or serrations 57 on each of its opposite surfaces for forming the teeth or serrations 28 on the half of the retainer 23 which is positioned above the central line L (FIG. 3). The second core member 44 also has a pair of parallel recessed side surfaces 58 for shaping the upper parallel portions 19 of the side walls 15, 16 of the body 11.

The webs 51, 56 of the first and second core members 43, 44 serve to separate the face and back plates 13, 14 from the slider 12 after the cord tightening device has been injection-molded by the mold assembly 40. One of the webs 51 and one of the webs 56 have openings 59, 60, respectively, which will communicate with the cavity 46 of the first mold member 41 when the mold assembly 40 is completed. The openings 59, 60 provide a path for introducing molten synthetic resin into the cavities 50, 55.

For injection-molding the cord tightening devide, the first and second mold members 41, 42 are brought together, and the first and second core members 43, 44 are inserted into the combined cavities 45, 48 from upper and lower ends, respectively, thereof until the distal ends of the first and second core members 43, 44 engage each other. At this time, the semicircular cavities 50, 55 of the first and second core members 43, 44 are combined into a substantially circular cavity. Then, molten synthetic resin is poured through the gate 49 into the cavities 48, 45, 46, 50, 55. After the poured mass has been solidified, the first and second core members 43, 44 are pulled out, and the first and second mold members 41, 42 are separated from each other, thus removing the molded cord tightening device.

As shown in FIG. 8, the step-like teeth or serrations 52, 57 of the first and second core members 43, 44 have surfaces parallel and normal to the direction in which the core members 43, 44 are moved toward and away from each other. Therefore, the step-like teeth or serrations 52, 57 do not obstruct the separation of the first and second core members 43, 44 from the molded retainer 23 of the slider 12. As a consequence, the slider 12 and the body 11 can be simultaneously injection-molded by the single mold assembly 40. The cord tightening device 10 can thus be manufactured simply and inexpensively.

Further, the cord tightening device allows easy insertion of the cord C therethrough even if the cord C is relatively thick.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A cord tightening device molded from synthetic resin comprising:
   a body having a pair of spaced face and back plates and a pair of spaced side walls interconnecting said face and back plates defining first and second openings permitting cord to pass therethrough, said face plate having a guide groove defined therein said guide groove defining a straight groove line down a center of the groove; and
   a slider movably disposed in said body and slidable in a slide direction along said guide groove, said slider having a retainer for pressing cord portions against said side walls, and a knob integral with said retainer and projecting through said guide groove above said face plate, said retainer having step-like teeth on opposite peripheral surfaces thereof for biting engagement with the cord portions, each of said step-like teeth being defined by a surface substantially parallel to said slide direction and another surface substantially perpendicular to said slide direction said step-like teeth serving as means for monotonically increasing the distance from each side wall to the groove line from adjacent the first opening toward the second opening, said side walls having respective series of teeth on inner surfaces thereof defined by a surface substantially Parallel to said direction and another surface substantially perpendicular to said direction for biting engagement with the cord portions, said retainer teeth being located on opposite sides of a central line of said retainer extending substantially perpendicularly to the direction in which said slider is slidable along said guide groove said retainer teeth serving as means for monotonically decreasing the distance from each of the peripheral surfaces to the groove line from the central line to nearly the end of the slider adjacent either the first or second opening.

2. A cord tightening device according to claim 1, each of said side walls comprising a straight portion and an inclined portion extending from said straight portion, said teeth being on said inclined portion adjacent to said straight portion.

3. A cord tightening device according to claim 1, said retainer being of a substantially circular shape.

4. A cord tightening device according to claim 1, said face plate having a pair of cord insertion slots defined therein one on each side of said guide groove and located inwardly of said side walls, respectively, for allowing a cord to be inserted therethrough into said body.

5. A cord tightening device according to claim 4, each of said cord insertion slots comprises a pair of spaced holes and a straight slit communicating between said holes.

6. A cord tightening device according to claim 5, each of said holes being substantially circular in shape.

7. A cord tightening device according to claim 6, each of said holes being elongate in shape.

* * * * *